United States Patent
Williams

(10) Patent No.: US 7,282,887 B1
(45) Date of Patent: Oct. 16, 2007

(54) LASER DIODE TRIGGERED SOFT START CONTROLLER FOR A POLYPHASE ELECTRIC MOTOR

(76) Inventor: Kevin R. Williams, P.O. Box 1359, Cypress, TX (US) 77410-1359

( * ) Notice: Subject to any disclaimer, the term of this patent is extended or adjusted under 35 U.S.C. 154(b) by 0 days.

(21) Appl. No.: 11/355,259

(22) Filed: Feb. 16, 2006

(51) Int. Cl.
*H02P 1/16* (2006.01)

(52) U.S. Cl. .................. 318/778; 318/805; 318/812; 318/767; 318/494

(58) Field of Classification Search ............. 318/778, 318/805, 801, 812, 767, 494
See application file for complete search history.

(56) References Cited

U.S. PATENT DOCUMENTS

| | | | | |
|---|---|---|---|---|
| 3,573,580 A | * | 4/1971 | Shinozaki | 318/778 |
| 3,742,370 A | * | 6/1973 | Hansen | 318/778 |
| 4,361,793 A | * | 11/1982 | Nordell | 318/729 |
| 4,896,828 A | * | 1/1990 | Peitz, Jr. | 236/10 |
| 6,781,342 B2 | * | 8/2004 | Tolbert et al. | 318/784 |
| 6,929,184 B2 | * | 8/2005 | Barkan | 235/462.25 |
| 7,088,321 B1 | * | 8/2006 | Parker | 345/83 |

* cited by examiner

*Primary Examiner*—Rita Leykin
(74) *Attorney, Agent, or Firm*—Egbert Law Offices

(57) ABSTRACT

A solid state soft start controller system has a power supply, an electric motor, a thyristor electrically interconnected between the power supply and the electric motor so as to selectively allow current to pass from the power supply to the phases of the electric motor, a laser diode optically connected to the thyristor, and a controller connected to the laser diode for triggering the laser diode. Separate thyristors are connected to each phase of the polyphase electric motor. Separate laser diodes and associated light pipes connect the laser diode to the separate thyristors.

21 Claims, 10 Drawing Sheets

LASER DIODE TRIGGERED SOFT START CONTROLLER FOR A POLYPHASE ELECTRIC MOTOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to electric motors having soft start electronic controls. More particularly, the present invention relates to soft start controllers that utilize thyristors. More particularly, the present invention relates to light-triggered thyristors for passing an electrical current to a soft start controller associated with an electric motor.

BACKGROUND OF THE INVENTION

Pioneering research by English physicist Michael Faraday led to the discovery of electromagnetic induction in 1830. Using a ring of soft iron, Faraday wound separate coils of wire on opposite ends of the ring. One of the wire coils was to a battery, causing a flow of electric current through the wire coil, magnetizing the iron ring and inducing current into the second wire coil. Current flow into the second coil was controlled with a manually operated switch which opened and closed the circuit, starting and stopping the flow of current.

In 1832, Joseph Henry, an American physicist engaged in experimental work similar to Faraday's by publishing a technical paper describing his own observations in the new found physics of electromagnetic induction. Henry described experiments in which large, bright electric arcs were produced when disconnecting a current carrying electrical cable from a battery. He noted that the wire and the battery terminal (current source) caused the current to continue its flow between the two connections while being pulled apart. The same phenomenon could be observed in a device such as a manual switch. Henry referred to this electric arcing phenomenon as "self-induction".

Development of the world's first electric generators and motors evolved out of the pioneering research by Faraday and Henry. Commercial production of the first prototype electric generators began in 1850 and motors in 1870. These early machines were powered by direct current (DC). In 1888 the first successful electrical system in America utilizing alternating current (AC) was developed by Nikoli Tesla. The wide use of AC power was furthered by the scientific efforts of early electrical engineers such as George Westinghouse and Charles Steinmetz. Although DC motors and devices continue in use, AC machines are the most prominent devices of choice. From the beginning serious technical problems were encountered in the starting and stopping of AC and DC rotating electric machines.

Research and engineering in the starting and stopping of AC and DC rotating electrical machines has evolved, out of necessity, into a highly specialized area of electrical engineering. Electrical devices for opening and closing motor circuits have evolved from the simplistic manually operated air-break switches used by Faraday and Henry into highly sophisticated vacuum contactors capable of handling enormous motor horsepower loads at voltages ranging up through 15 Kv.

Until the introduction of vacuum technology about 25 years ago, variations of air-break switches, breakers, magnetic contactors and combinations of these devices in numerous configurations were the only practical devices available to start and stop AC & DC rotating electrical machines. Vacuum technology offers an alternative to air-break devices by confining the arcing phenomenon to the interior of a sealed vacuum container. Vacuum technology offered so many inherent advantages over the old air-break method that it quickly became the technology of choice for controlling AC and DC rotating electrical machines of all sizes. Today, vacuum contactors are the predominant devices of choice in controlling the start-stop application of medium voltage motors (2.4 Kv-15 Kv) of all types.

About 40 years ago electrical researchers began experimenting with solid state motor starting techniques. This research explored various methodologies for starting AC and DC rotating electrical machines. A solid state motor starter uses electronic circuitry in place of the traditional contactors or switches to start and stop a motor. Dependable low voltage solid state starters for small motor loads became commercially available about 20 years ago and today are available for a wide range of motor loads and higher voltages. Inherent characteristics of the solid state starter are its low starting current requirements in bringing a large motor load up to full speed and its controlled soft stop capability when taken off line. This is especially advantageous in applications involving large medium voltage motors. These types of controllers are referred to commercially as a "solid state soft start". High cost, sophisticated circuitry and technical limitations have traditionally restricted use of these devices to specialized applications. Solid state soft start controllers for large medium voltage motor applications are domestically manufactured by only a few specialty companies.

Within the solid state family of devices, controllers known as "variable speed drives" were an early product of solid state motor controller research. In addition to starting and stopping duty, these device also have speed control capability of the rotating electrical machine(s) during normal operation and start-stop cycles. These are hybrid devices using a sophisticated combination of solid state electronic magnetic or vacuum contactors and other components configured into a "control system". They are available from numerous foreign and domestic manufacturers for a full range of low voltage through medium voltage motor applications. The high cost and the sophisticated technical nature of these systems restrict their use to highly specialized applications.

The present inventor is also the inventor of U.S. Pat. No. 6,208,111, issued on Mar. 27, 2001, for a motor starter arrangement with a soft start electronic control. This improved starter assembly is arranged, packaged and dimensioned so as to be substituted within an external profile of an existing motor starter. Each leg of the motor starter includes an electrical path which includes a main motor fuse and an in-line contactor and a soft start circuit. The soft start circuit includes a fuse, a voltage transformer, a current transformer and an electronic control system on a control card. The control card controls thyristors, along with a bypass contactor, in a conventional manner. The electronic control card controls the firing of the thyristors and the bypass contactor.

This patent utilized the commonly used thyristor as the solid state soft start controller. These electrically triggered thyristors are limited in reliability by the low di/dt and dv/dt and require the use of metal oxide varistors for protection against voltage surges, spikes or line faults. Metal oxide varistors pose a safety risk to personnel and equipment. These metal oxide varistors are explosive by nature and design. In addition, these electrically triggered varistors require localized firing boards in addition to fiberoptic firing interface boards. These electrically triggered varistors will have one line for the passage of voltage and current to the motor and another electrically actuated trigger line. In the wiring of the system, these lines will be placed in close proximity to each other. Surges from the main power line can create a "soft gating" of the thyristor based upon the noise in the main power line. As a result, it is somewhat difficult to electrically isolate the triggering electrical line from the main power line extending to the thyristor. The repeated soft gating of such thyristors can eventually damage the thyristors and will result in the replacement of such thyristors. In other circumstances, these electrically triggered thyristors would be destroyed upon receipt of power surges through either the triggering line or the main power line. For example, lightning strike in the vicinity of such lines could easily pass into the thyristor so as to cause a overload condition in the thyristor and eventually destruction of such electrically triggered thyristor.

The thyristor is a well known power semi-conductor switch that permits large currents to be switched at high voltages. The thyristors has four semi-conducting layers. Typically, the two outer layers are heavily doped extrinsic layers, while the inner two are lightly doped. Adjacent layers are oppositely doped from their neighbors, forming a number of semi-conductor junctions therebetween. The thyristor is turned on when carriers enter one of the inner layers. Typically, this is performed by injecting a small gate current pulse into one of the inner layers. Where the gate current is injected over only a portion of the inner layer, the current through the thyristor does not reach a maximum value until the entire layer is conducting. The time taken for the current to spread laterally to fill the layer is limited by the lateral carrier defusion velocity. The device only reaches full current capacity after the carriers have defused sufficiently to uniformly saturate the device.

Light-triggered thyristors have been developed to use optical triggering to actively switch on and/or off. Optical activation involves illuminating the semi-conductor device with light. The light is absorbed within the semi-conductor so as to produce electron-hole pairs at the site of absorption. Thus, optical activation permits the generation of carrier pairs within the device and does not require the injection of carriers. Hence, where the illuminating light pulse is short, optical activation can create carriers within the device considerably faster than injection, which is limited in speed by the carrier drift velocity. Optical activation can be used for switching semi-conductors on by a creating a population of carriers, for example, within a junction.

The judicious selection of the wavelength of the activating light results in the ability to control the absorption depth, and hence the volume of semi-conductor material activated by the optical pulse. This permits the fraction of wafer real estate devoted to activation to be reduced relative to that required for gate current activation, and hence the fraction of wafer real estate used for carrying the high power current is increased. The uniform illumination of the device give the possibility of combining fast turn-on times with large current carrying capacity.

One such optical-controlled thyristor is described in U.S. Pat. No. 6,218,682, issued on Apr. 17, 2001, to Zuker et al. This patent describes an optically controlled thyristor having a four layer thyristor structure with respective first, second, third and fourth layers. The first and third layers have a first doping type, and the second and fourth layers have a second doping type different from the first doping type. A first shorting structure, formed from a semi-conductor material of opposite doping from the first layer, is electrically coupled with the second layer by an electrically conducting, optically opaque layer. A first conductor layer connects between the first layer and the shorting structure and is adapted to transmit light into the first shorting structure. The first semi-conductor layer of an optically actuated thyristor has an aperture therethrough to permit light to enter the second layer from a first conductive layer side without proper gating within the first layer. The light source that is used for activating the silicon device is a Ndsup.3+ solid state laser. This laser has a laser line at a wave length of approximately 1.06 nanometers, which corresponds to an absorption depth in silicon of about 1 millimeter.

It is object of the present invention to provide an apparatus of method and method of soft starting a medium voltage polyphase motor with a solid state soft start controller utilizing laser diode firing, direct fiberoptic coupling isolation and light-triggered thyristors.

It is another object of the present invention to provide a method and apparatus for conversion of existing soft starters using electrically-triggered thyristors and metal oxide varistors into a solid state soft starter utilizing laser diode firing, direct fiberoptic coupling isolation, and light-triggered thyristors.

It is a further object of the present invention to provide greater thyristor reliablity.

It is a further object of the present invention to eliminate metal oxide varistors from the soft starters.

It is a further object of the present invention to provide greater electrical isolation from medium and high voltage sources.

It is a further object of the present invention to provide an apparatus which eliminates the phenomenon of "soft gating" which occurs in electrically-triggered thyristors.

It is a further object of the present invention to minimize the number of components used to trigger and protect the thyristors.

It is still a further object of the present invention to provide a smaller solid state soft starter than is currently available commercially.

These and other objects and advantages of the present invention will become apparent from a reading of the attached specification and appended claims.

BRIEF SUMMARY OF THE INVENTION

The present invention is a solid state soft start controller utilizing layer diodes. The controller of present invention is applied to the starter assembly of an electric motor. This starter assembly is a polyphase (in particular, three phase) electric motor. Typically, the motor will be a large, medium voltage motor. The motor will have surge protection electrically connected at the electrical input to the motor so as to prevent electrical surges from adversely affecting the motor.

A light-triggered thyristor system is electrically connected in multiple phases to the motor. Separate thyristors are connected to each phase of the starter assembly of the motor. In particular, in one embodiment of the present invention, a pair of thyristors are connected in series to each phase of the starter assembly.

The thyristor system is made up of a plurality of light-triggered thyristors. In particular, a light pipe is connected to a laser diode. This light pipe is in optical communication with the thyristor. The laser diode, to which the light pipe is connected, is associated with the control system for the present invention. In particular, the thyristor is triggered from a 940 nanometer laser producing a minimum of 40 milliwatts of power.

The thyristor system associated with the present invention utilizes a plurality of break-over diodes associated with each phase of the thyristor system. These break-over diodes are integrally connected to the thyristors. The break-over diodes serve to dump voltage above a certain level away from the thyristors and onward toward the surge protection system associated with the starter assembly of the electrical motor. The thyristor system electrically connects the power supply to each phase of the motor. The thyristor system will ramp to increase voltage at a constant rate through the motor. The thyristor system will allow the power supply to go to the current limit on the waveform. Additionally, in the present invention, the light pipe associated with each of the thyristors is electrically isolated from the power supply and the electrical lines from the power supply.

The controller is in the form of a panel electrically and optically connected to the thyristor system. The controller includes suitable sensors for monitoring the voltage supply phase and sink from the power supply. A separate sensor serves to monitor the motor for current feedback. The control panel also includes the laser diode board. The controller will fire the laser diode so as to cause light from the laser diodes to pass into and through the light pipes to the particular thyristors. The controller will fire the laser diodes relative to the monitored voltage phase and sink and in relation to the motor current.

In the present invention, the power supply is a 120 volt AC power supply.

DETAILED DESCRIPTION OF THE INVENTION

Figure 1:
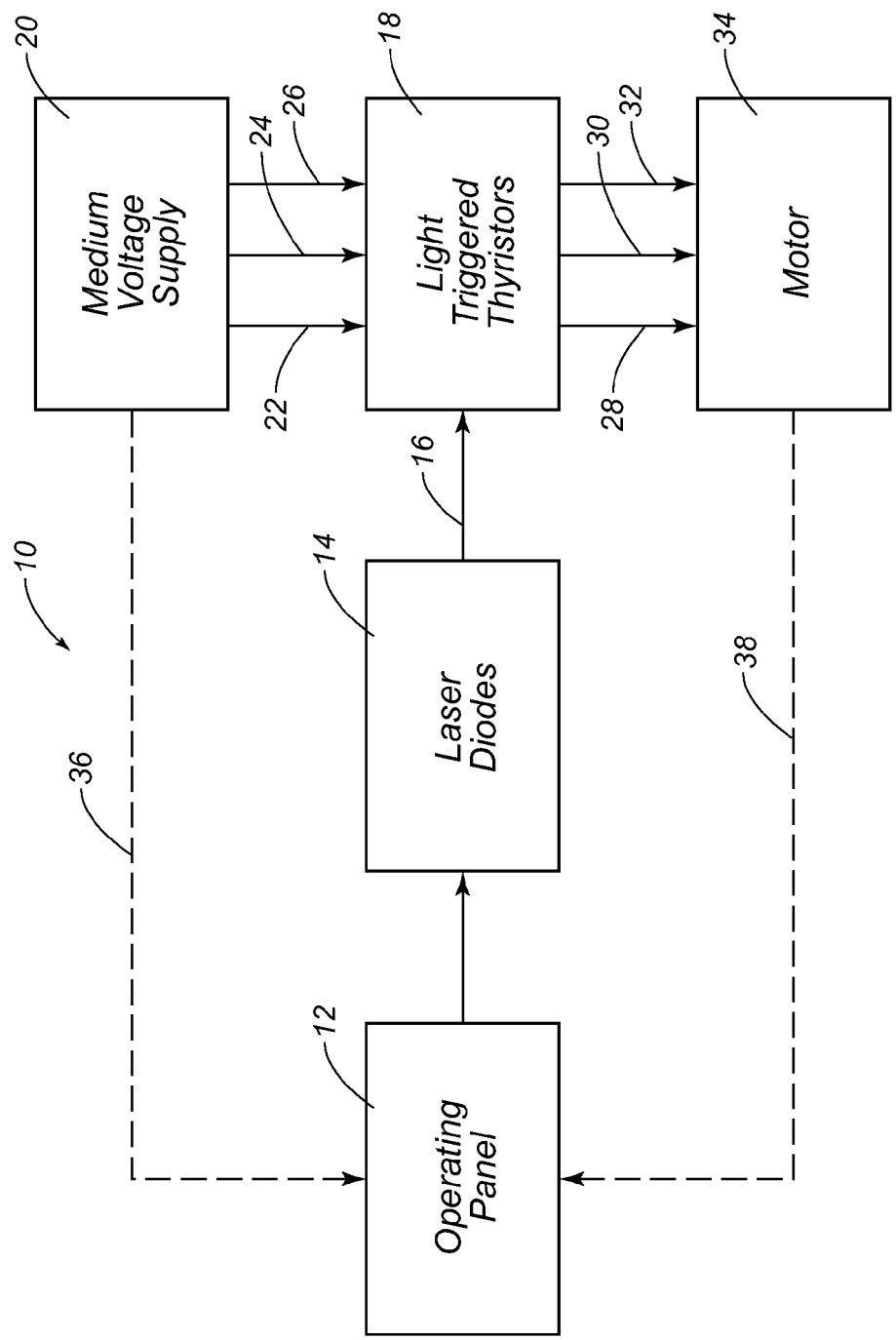
FIG. 1 is block diagram showing the operation of the solid state soft start controller in accordance of the teachings of the present invention.
Figure 2A:
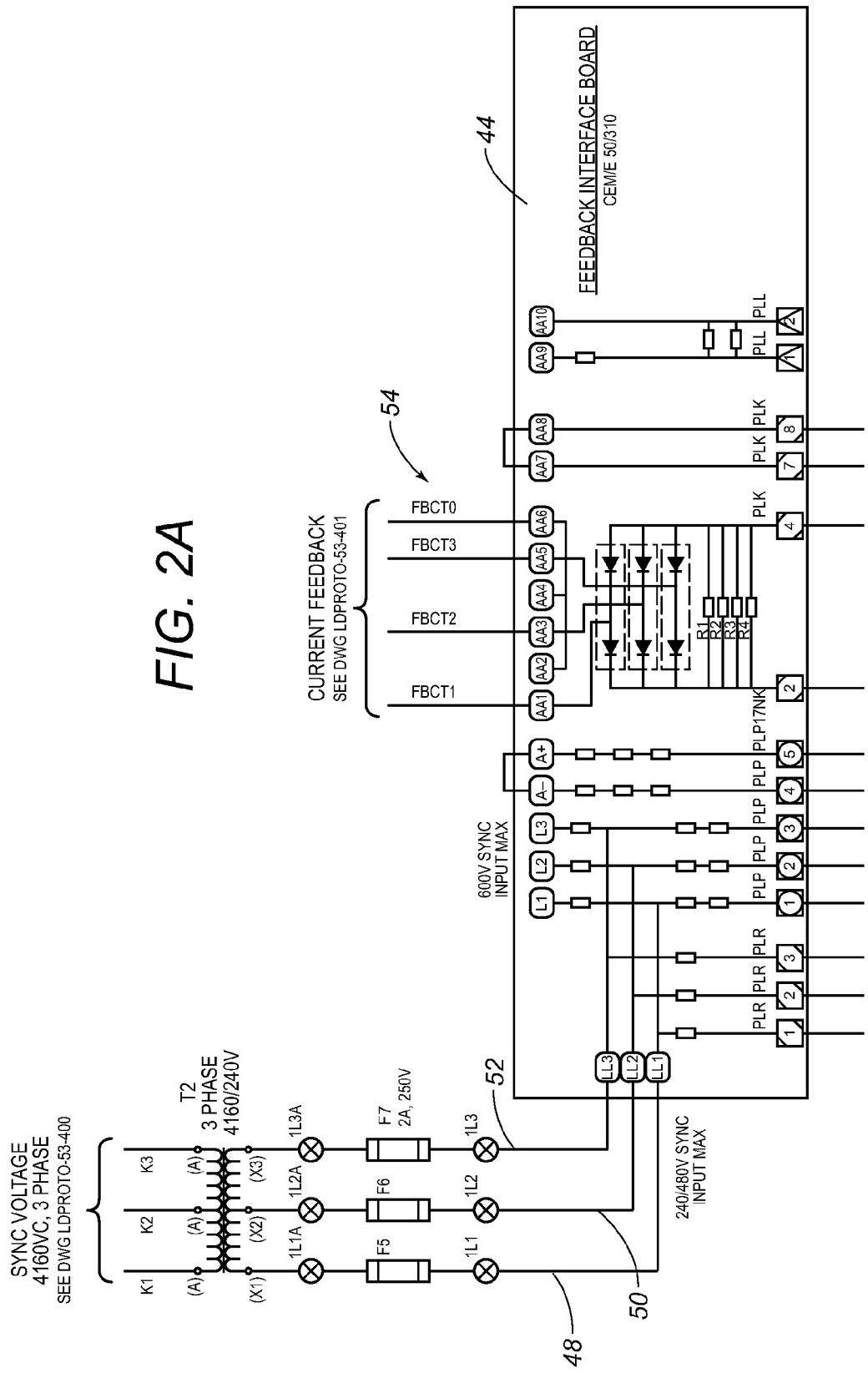
FIG. 2 is an electrical schematic of the control panel associated with the system of the present invention.
Figure 2B:
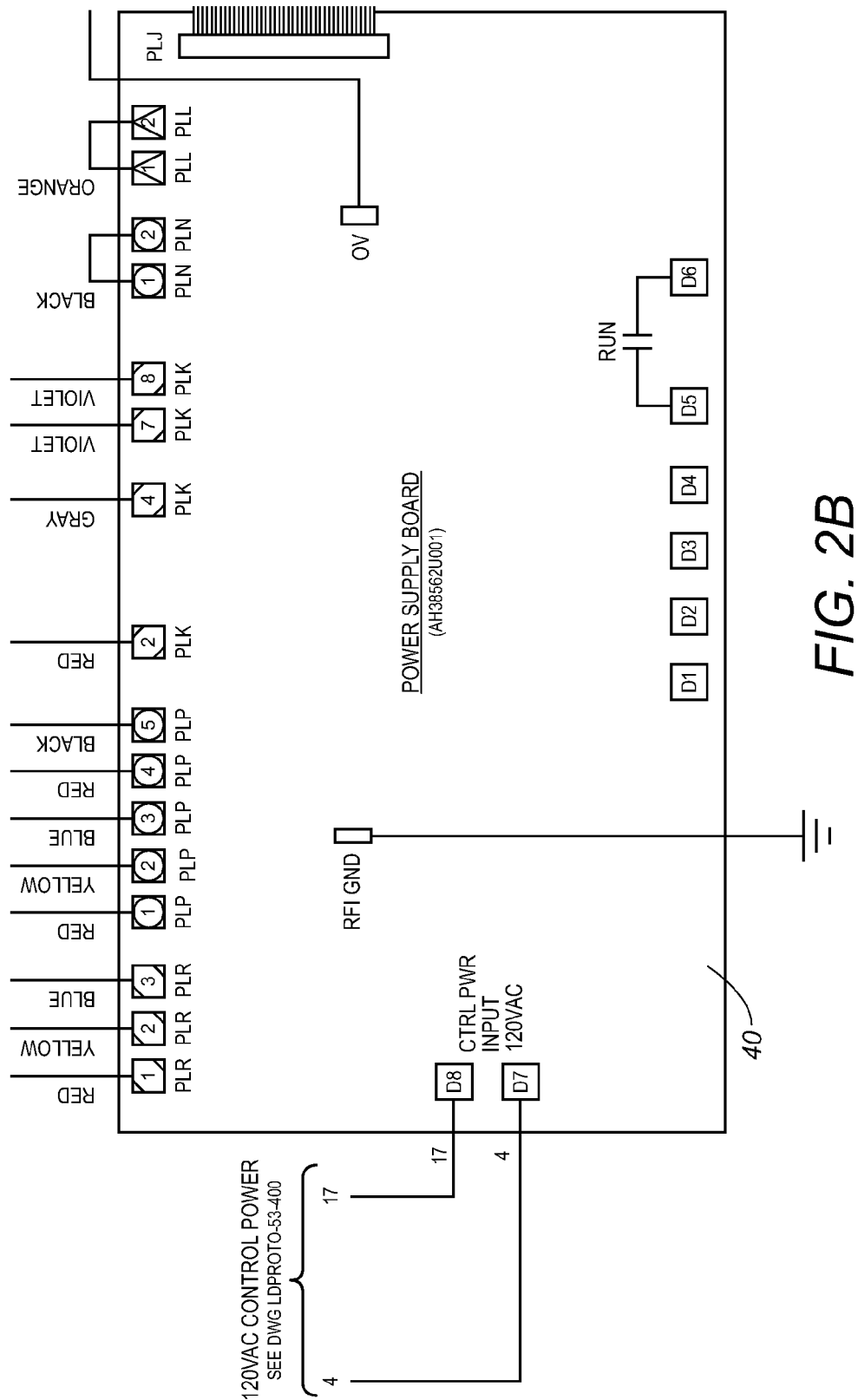
Figure 2C:
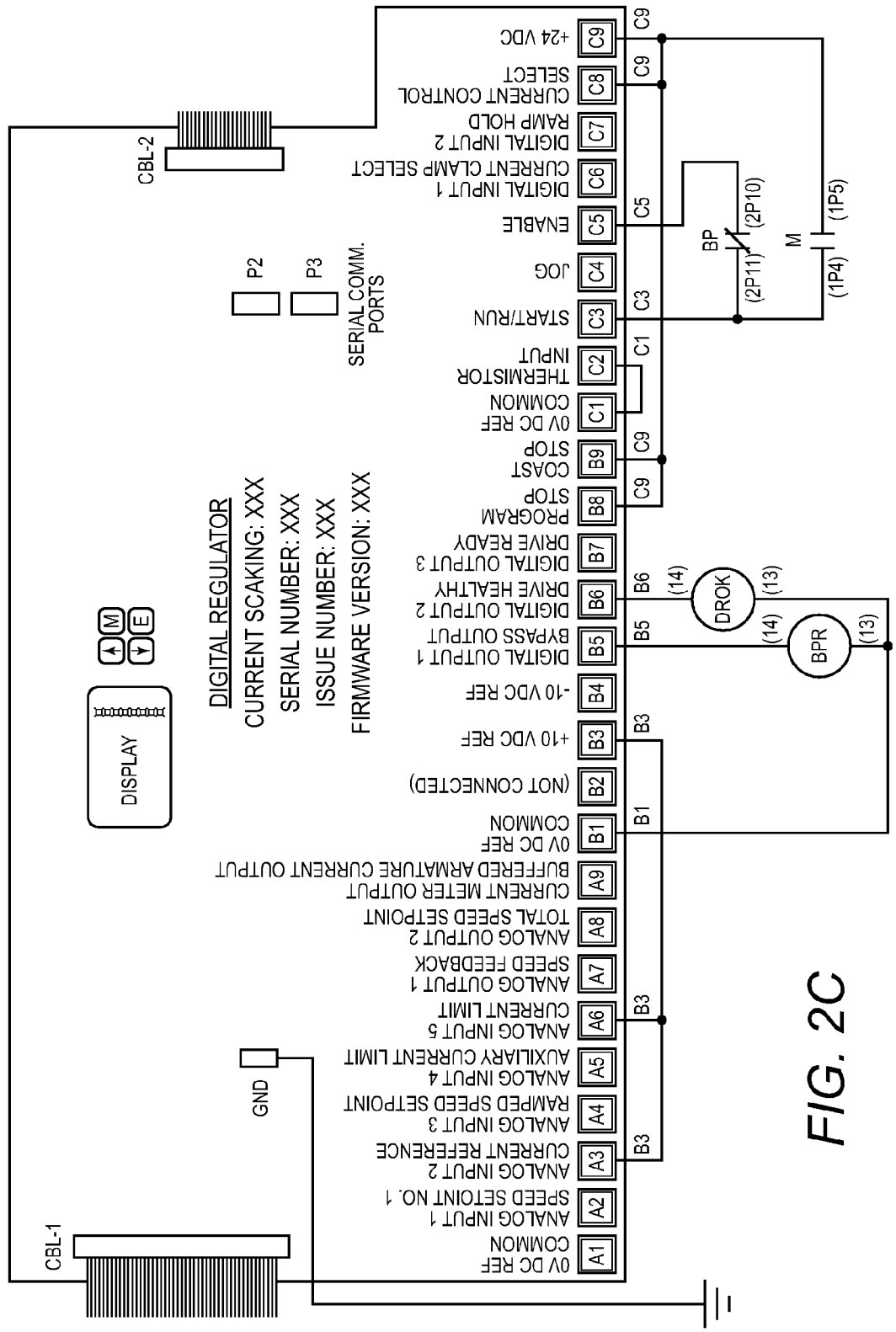
Figure 2D:
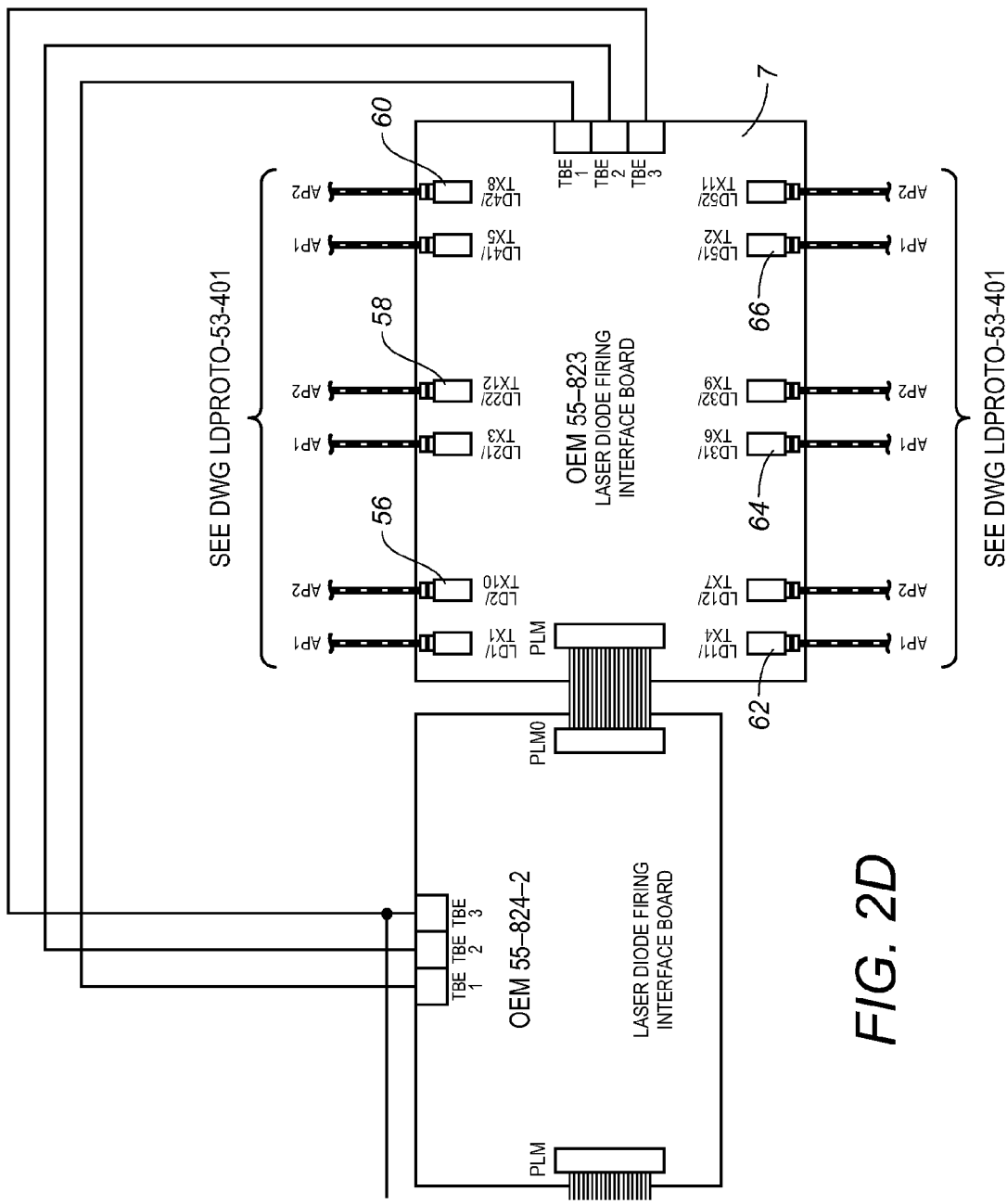

Referring to FIG. 1, there is shown the system 10 of the present invention for the soft start controller associated with the present invention. The system 10 includes an operating panel 12 which is electrically connected to a plurality of laser diodes 14. The laser diodes 14 are optically connected along path 16 to the light-triggered thyristors 18. The light-triggered thyristors are provided so as to receive power from a medium voltage power supply 20 along each of the phases 22, 24 and 26. Phases 22, 24 and 26 are connected to separate thyristors or to separate in series pairs of thyristors 18. The laser diodes 14 are cooperative with the light-triggered thyristors 18 so as to allow power to pass with current limited to each of the phases 28, 30 and 32 of motor 34. Motor 34 is an electric motor of large size and medium voltage. The operating panel 12 has a first sensing line 36 electrically connected to the medium voltage power supply 20. This sensing line 36 will monitor the voltage supply phase and sink from the power supply 20. Similarly, another sensing line 38 is connected to the motor 34 and cooperative with the operating panel 12 so as to allow the controller to monitor the motor 34 for current feedback. As a result, the processors in the operating panel 12 can suitably fire the laser diodes 14 for the operation of the light-triggered thyristors 18 so as to optimally "soft start" the motor 34.

The operating panel 12 was designed around the GE LIMITAMP™ and 9700 Series control board. New and improved control/monitoring systems can be added to such a control board so as to enhance the reliability of the medium voltage starter associated with motor 34. The operating panel 12 includes an interface board which is a smart link between the operating panel 12 and the power bridge. This interface board receives firing signals from the control board and distributes them to the proper laser transmitters associated with laser diodes 14. The laser diodes 14 are then fired to the proper light-triggered thyristors 18. The 9700 Series control board 12 receives all of the feedback signals from the system, from the AC motor current, from thermal switches, and others. The operating panel 12 monitors these signal and generates an internal status/alarm signal.

The light-triggered thyristors 18 have built-in break-over diodes, to be described hereinafter. The light-triggered thyristors 18 have a PIV rating of 7000 to 8000 volts, a higher $d_v/d_t$ (typically 2000V/microseconds) and higher $d_i/d_T$ ratings (from 300 A/microseconds to 15000 A/microseconds). This arrangement will eliminate the need for metal oxide varistors, firing boards, and an associated power supply. As a result, the overall configuration of the system 10 is smaller than that for the electrically-triggered thyristors. The thyristors are fiber optically coupled directly to the laser diode board 14.

The three phase power supply 20 is composed of high voltage, high $d_v/d_T$, high $d_i/d_T$ thyristors. Depending on the working voltage of the starters associated with motor 34, there could be one, two, three or even more light-triggered thyristors 18 connected in inverse parallel series in each phase. The thyristors 18 are mounted between cylindrical, nickel-plated copper heat sinks. This assures the proper heat absorption and cooling for these devices. The light-triggered thyristors 18 are protected from over voltages, voltage spikes and high $d_v/d_T$ using high voltage break-over Diodes are built into each thyristor in conjunction with high reliability snubber boards.

FIG. 2 is a detailed electrical schematic showing the operating panel 12 associated with the system of the present invention. The operating panel 12 will includes a power supply board 40, a digital regulator 42, a feedback interface board 44, and a laser diode firing board 46. The digital regulator 42 will provide feedback information to the operator as to the operations associated with the starter associated with motor 34. Various warning lights and control elements can be incorporated into the digital regulator. The feedback interface board includes sensor lines 48, 50 and 52 which will be connected to the phases associated with the voltage supply 20. As a result, the voltage supply phase and sink can be properly monitored by the interface board 44. Current feedback is provided to the feedback interface board by current feedback lines 54. These current feedback lines are connected through the motor 34 so as to provide information regarding the operating current associated with the motor at any point in time.

The power supply board 40 will monitor the power supply 20. The power supply board 40 can also provide power to the digital regulator, along with the power of the firing of the laser diodes associated with the laser diode firing board 46.

It can be seen that the laser diode firing board 46 has a plurality of laser diode pairs 56, 58, 60, 62, 64 and 66. Each of these laser diode pairs 56, 58, 60, 62, 64 and 66 will be optically connected separately to the light-triggered thyristors 18. The digital regulator 42 will be suitably connected electrically to the laser diode firing board 46 so as to properly and sequentially fire the separate diodes on the firing board 46 for the purpose of opening and closing the thyristors 18.

Figure 3A:
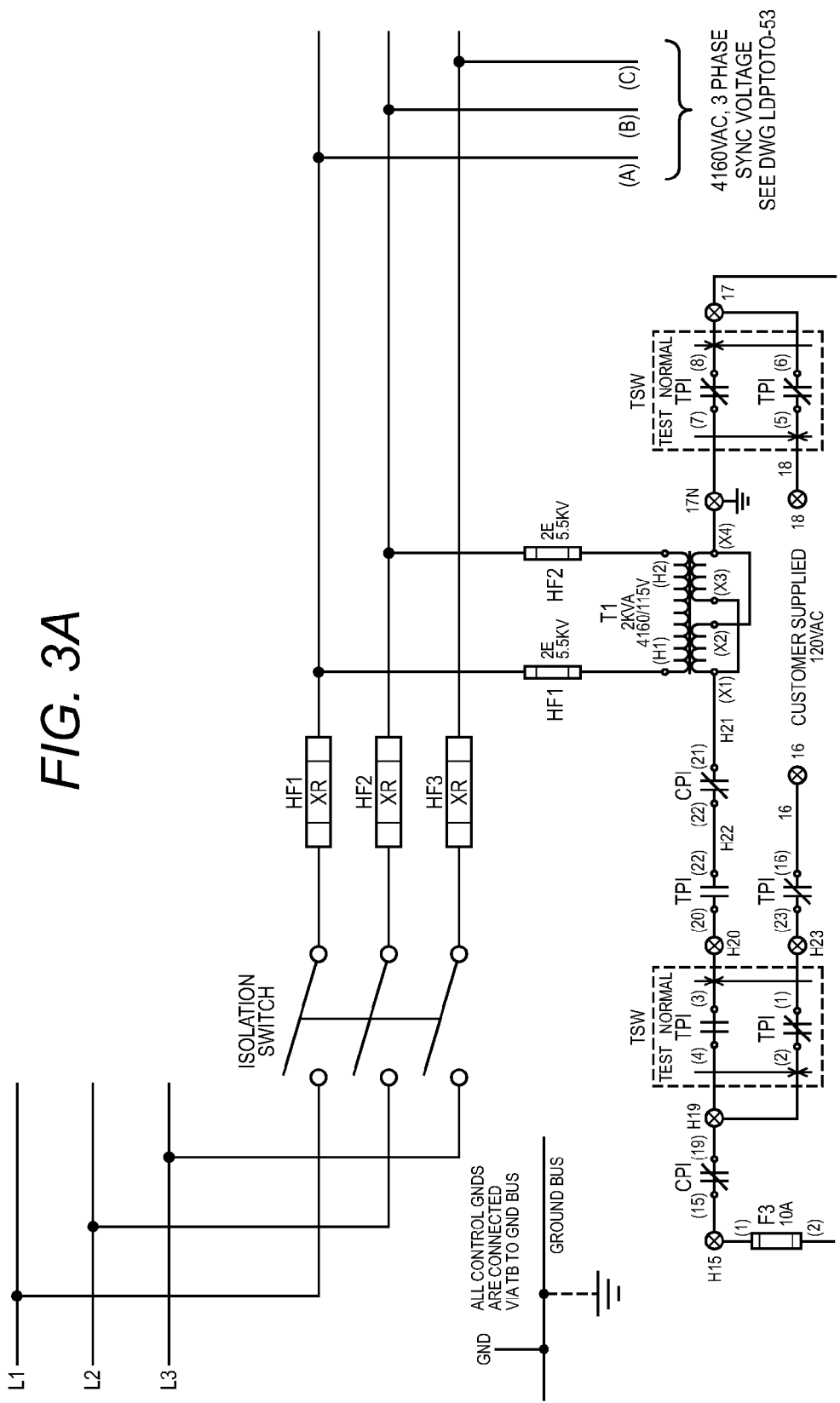
FIG. 3 is a electrical schematic showing the connection between the power supply, the light-triggered thyristors, the break-over diodes and the starter assembly.
Figure 3B:
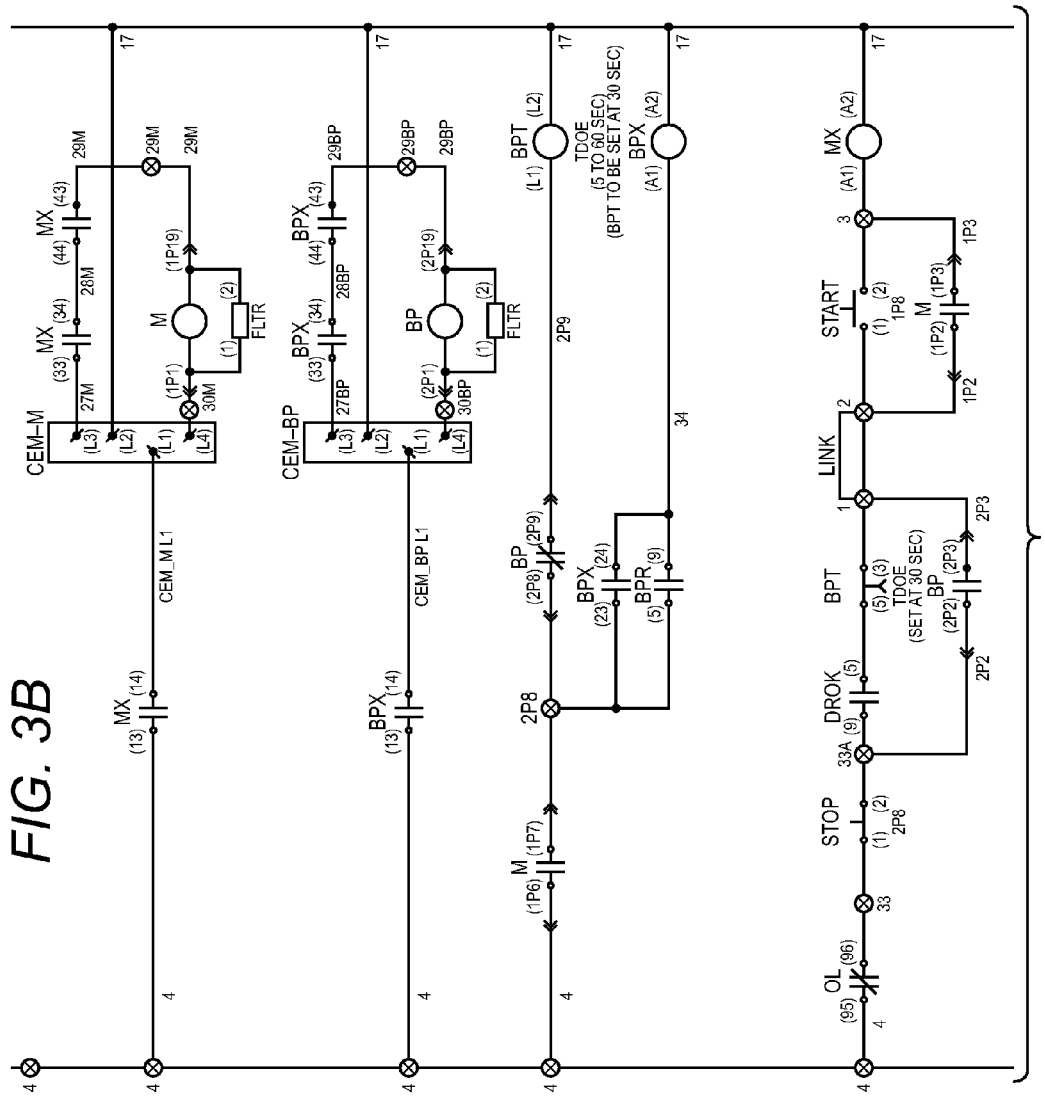
Figure 3C:
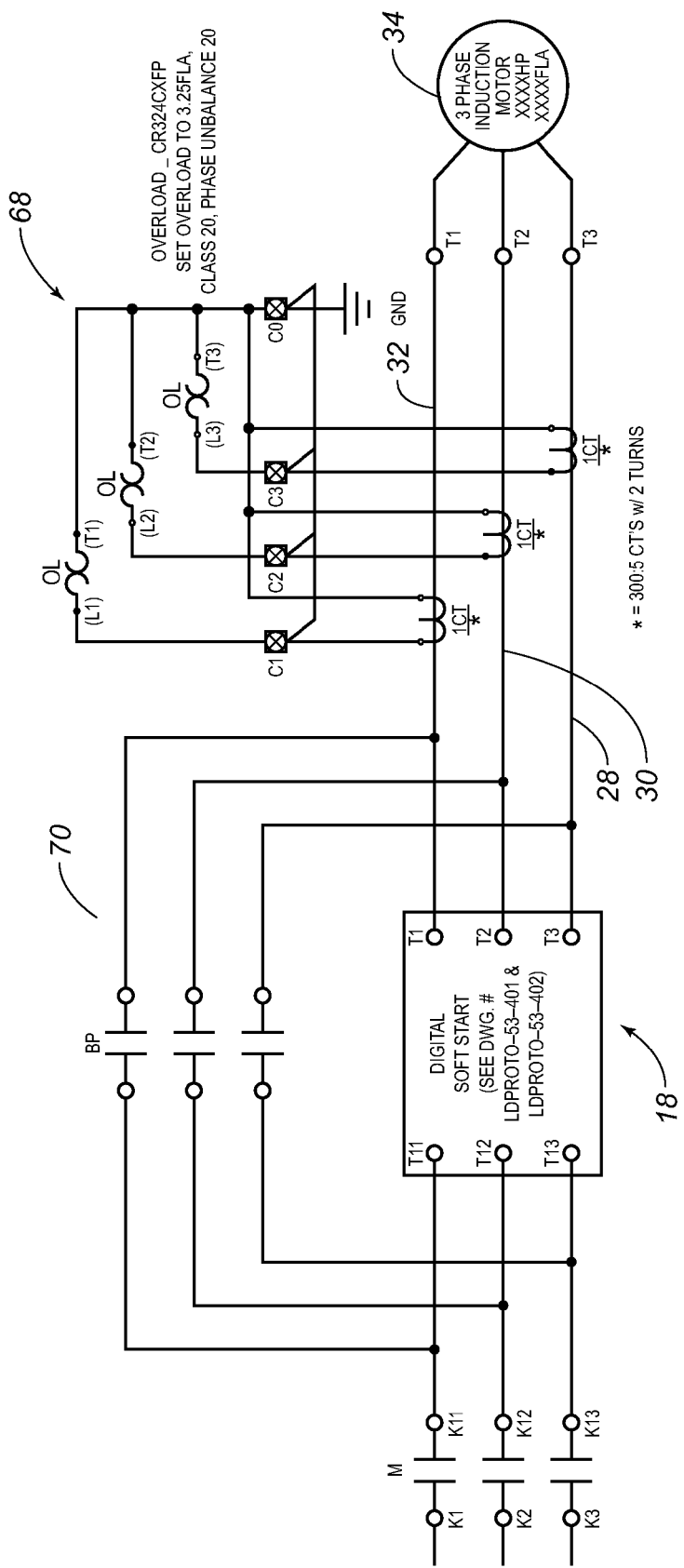

FIG. 3 shows the positioning of the light-triggered thyristors in the electrical schematic associated with system 10. The thyristors 18 are connected along phase lines 28, 30 and 32 to the starter associated with the motor 34. A surge protection system 68 has transformers associated with each of the phase line 28, 30 and 32. In the event that the break-over diodes of the light-triggered thyristors 18 should be activated, the surge of power will bypass the thyristors 18 and be directed to the surge protection system 68. As a result, voltage spikes are effectively prevented from damaging the starter associated with motor 34. The three phase power supply 20 is connected to the separate phases 22, 24 and 26 transmitted to the thyristors 18. The break-over diodes 70 are connected to each of the phase lines. If a voltage spike should occur, the break-over diodes will cause back-to-back diodes to open so that the voltage spike will flow in the path of least resistance around the thyristors 18. As a result, the break-over diode system 70 avoids any possibility of damage to the light-triggered thyristors 18. The various controls associated with the digital regulator 42 are connected to the phase lines associated with motor 34 in section 72. Digital controller 72 can include the various buttons for manual operation of the starter associated with motor 34 and/or for the monitoring of the operation of the starter in its soft start mode.

Figure 4A:
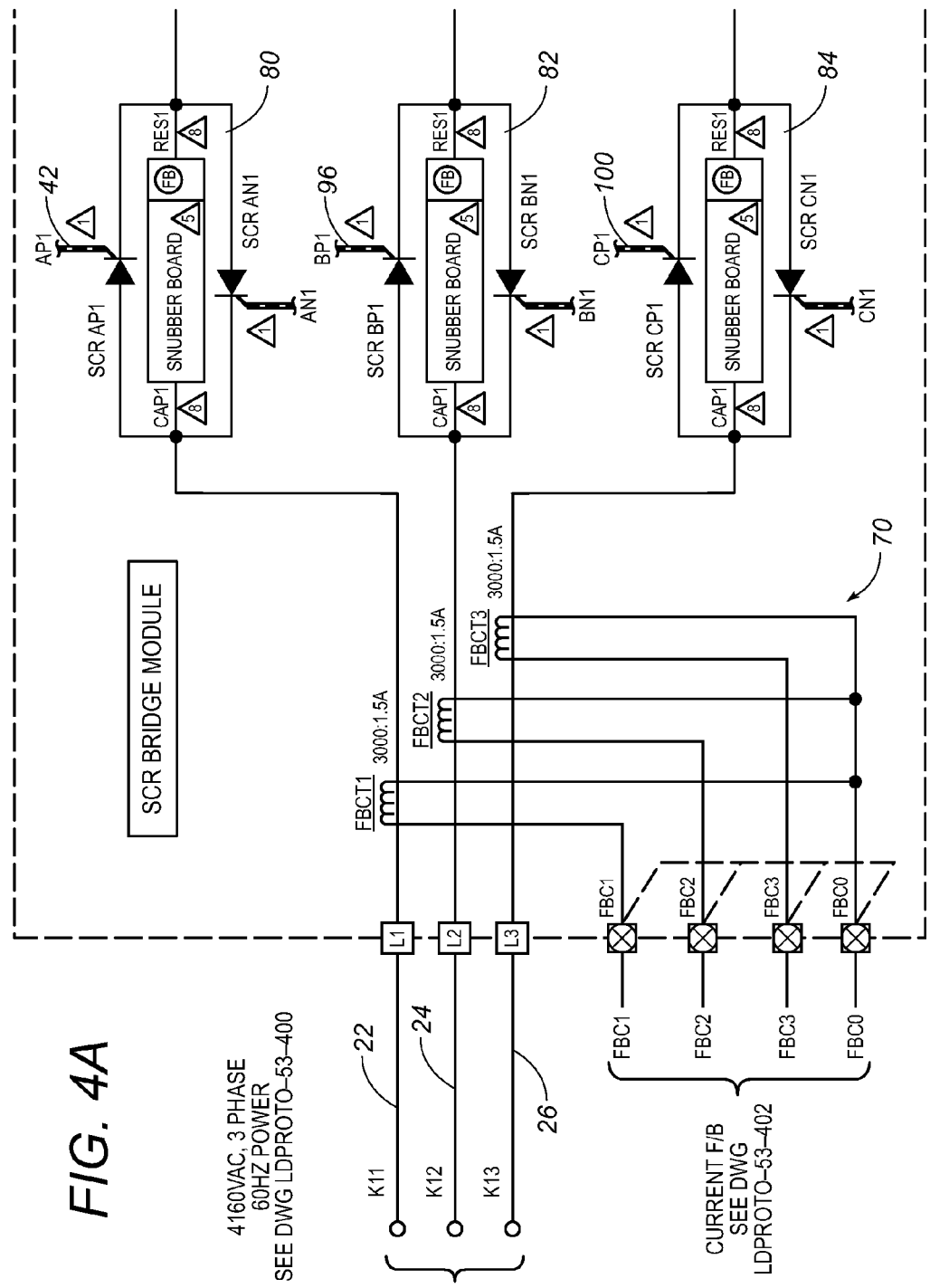
FIG. 4 is an electrical schematic showing the configuration of the light-triggered thyristors in accordance with the teaching of the preferred embodiment of the present invention.
Figure 4B:
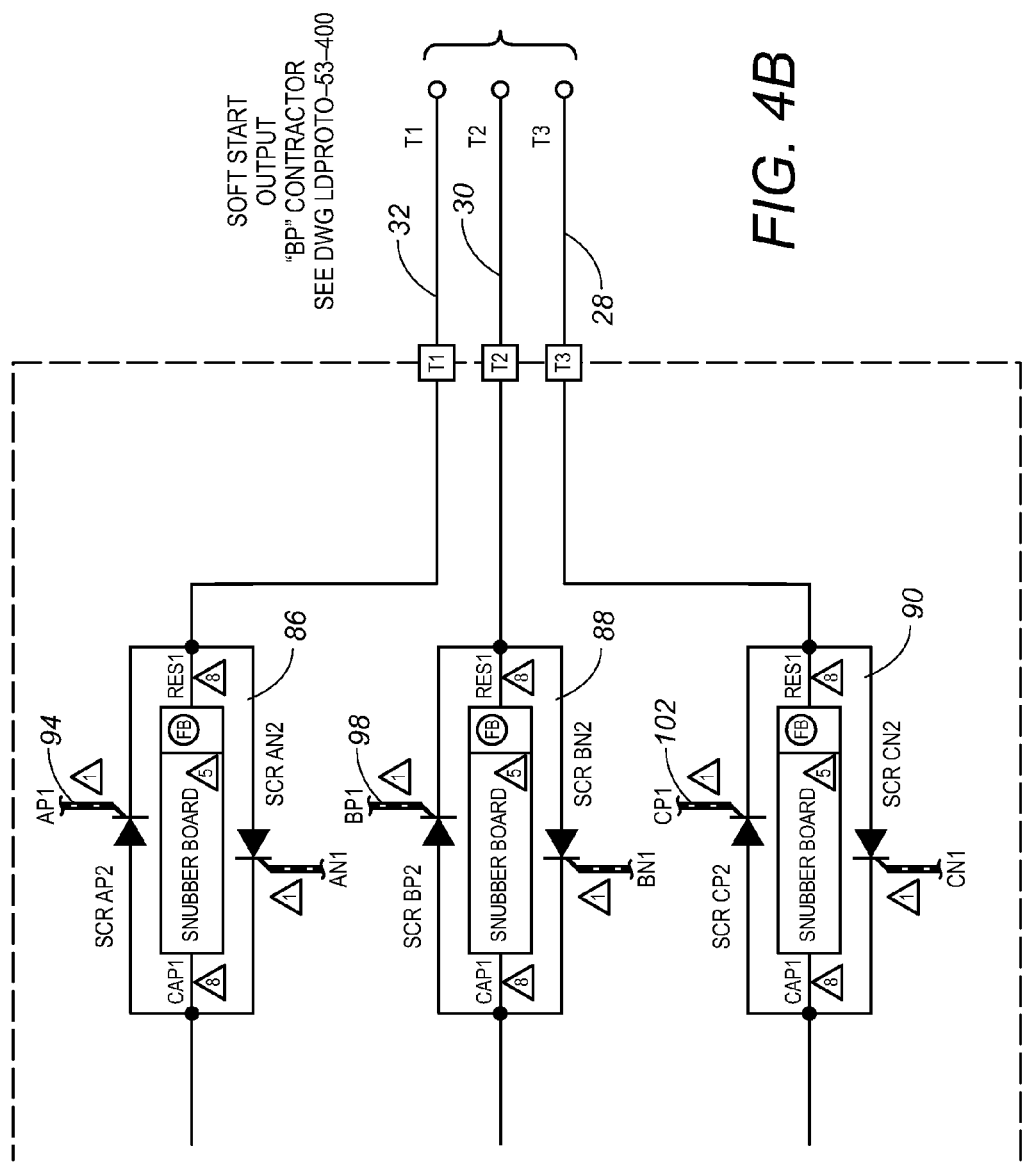

FIG. 4 illustrates the light-triggered thyristor module 18 associated with the present invention. As can be seen, phase lines 22, 24 and 26 connect with the thyristor module 18. Similarly, phase lines 28, 30 and 32 are connected with the opposite end of the thyristor module 18. The break-over diodes 70 are particularly illustrated so as to provide overload protection and to prevent damage to the thyristors 80, 82, 84, 86, 88 and 90 within the module 18. Thyristors 80 and 86 are connected in series. Thyristors 82 and 88 are connected in series. Finally, thyristors 84 and 90 are connected in series. Additional thyristors can also be connected in respective series depending upon the capacity of the motor 34 and upon further requirement of the system. The placement of the thyristors in series assures further protection to the operation of the system in the event of thyristor failure.

In FIG. 4, it can be seen that light pipe 92 connects the thyristor 80 to a laser diode in laser diode pair 56. Light pipe 94 connects the thyristors 86 to another of the laser diodes of pair 56. Light pipe 96 connects thyristors 82 to one of the laser diodes of pair 58. Similarly, light pipe 98 connects the thyristor 88 to the other of the laser diodes 58. Light pipe 100 connects the thyristor 84 to one of the laser diodes 60. Light pipe 102 connects thyristor 90 to another of the laser diodes 60. Similarly, light pipe on the opposite side of the respective thyristors are connected to respective laser diodes 62, 64 and 66. As a result, each of the thyristors 80, 82, 84, 86, 88 and 90 can fire, when required, for the opening and closing of the circuit connecting the power supply to the starter of motor 34.

The present invention provides greater safety, reliability and electrical isolation. In particular, since a light pipe is used to connect the thyristors to the firing mechanism, the close association of the trigger line and the power supply line can be avoided. As a result, power supply line is electrically isolated from the optical fiber used for the transmission of the laser beam to each of the thyristors. The result of this is that "soft gating" is prevented. Any noise in the power line will not affect the trigger specific thyristor. The present invention utilizes the light-triggered thyristors in order to avoid the need of the firing card and the metal oxide varistors associated with the electrically-triggered thyristors. Since the metal oxide varistors have explosive potential, it is desirable to avoid any potential explosions in the sensitive electronic environment associated with the starter motor. Additionally, by utilizing the light-triggered thyristors, the additional components required for electrically-triggered thyristors are effectively avoided. The cost associated with these extra components is avoid through the use of the present invention. Although light-triggered thyristors are slightly more expensive than electrically-triggered thyristors, the elimination of the other components associated with the firing mechanism will create a cost advantage to the system 10 of the present invention.

The present invention provides greater reliability by providing higher di/dt and dv/dt ratings. The use of the break-over diodes will assure that any surges affecting the power supply to the starter olf motor 34 will bypass the thyristors 18. Damage thereto is effectively prevented and reliability of the system is enhanced.

Since the present invention utilizes fewer components, it is possible to minimize the overall size and weight of the solid state soft start. As a result, the present invention can be delivered as a compact package for installation in place of the existing soft starter systems.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A solid state soft start controller system comprising:
   a power supply;
   an electric motor;
   a thyristor means electrically interconnected between said power supply and said electric motor, said thyristor means for selectively allowing current to pass from said power supply to said electric motor;
   a light-emitting diode optically connected to said thyristor means; and
   a controller means connected to said light-emitting diode for triggering said light-emitting diode;
   a surge protector electrically connected to said electric motor; and
   a breakover diode means electrically connected between said power supply and said electric motor, said breakover diode means for dumping voltage above a desired level away from said thyristor means and to said surge protector.

2. The system of claim 1, said electric motor being a three-phase motor, said thyristor means comprising:
a first thyristor connected to a first phase of said three-phase motor;
a second thyristor connected to a second phase of said three-phase motor; and
a third thyristor connected to a third phase of said three-phase motor.

3. The system of claim 2, each of said first thyristor and said second thyristor and said third thyristor comprising a pair of thyristors connected in series.

4. The system of claim 2, further comprising:
a first breakover diode electrically connected to said first phase of said three-phase motor;
a second breakover diode electrically connected to said second phase of said three-phase motor; and
a third breakover diode electrically connected to said third phase of said three-phase motor.

5. A solid state soft start controller system comprising:
a power supply;
an electric motor;
a thyristor means electrically interconnected between said power supply and said electric motor, said thyristor means for selectively allowing current to pass from said power supply to said electric motor;
a light-emitting diode optically connected to said thyristor means; and
a controller means connected to said light-emitting diode for triggering said light-emitting diode, said thyristor means for ramping to increase voltage at a constant rate from said power supply to said electric motor.

6. The system of claim 5, said thyristor means for allowing the current from said power supply to go to a current limit on a waveform of the current.

7. A solid state soft start controller system comprising:
a power supply;
an electric motor;
a thyristor means electrically interconnected between said power supply and said electric motor, said thyristor means for selectively allowing current to pass from said power supply to said electric motor;
a light-emitting diode optically connected to said thyristor means;
a controller means connected to said light-emitting diode for triggering said light-emitting diode, said electric motor being a three-phase motor, said thyristor means comprising:
a first thyristor connected to a first phase of said three-phase motor;
a second thyristor connected to a second phase of said three-phase motor; and
a third thyristor connected to a third phase of said three-phase motor;
a first light pipe optically connected between said light-emitting diode and said first thyristor;
a second light pipe optically connected between said light-emitting diode and said second thyristor; and
a third light pipe optically connected between said light-emitting diode and said third thyristor.

8. The system of claim 7, said light-emitting diode comprising:
a first laser diode optically connected to said first light pipe;
a second laser diode optically connected to said second light pipe; and
a third laser diode optically connected to said third light pipe.

9. The system of claim 8, each of said first laser diode and said second laser diode and third laser diode being a 940 nanometer laser producing a minimum of 40 milliwatts of power.

10. The system of claim 7, said power supply being a 120 volt AC power supply.

11. The system of claim 7, said controller means being optically interconnected to said thyristor means, said controller means comprising:
a first sensor means electrically connected to said power supply for monitoring voltage supply phase and sink; and
a second sensor means electrically connected to said electric motor for monitoring current feedback from said electric motor, said controller means for firing said light-emitting diode relative to the monitored voltage supply phase and sink and relative to the monitored current feedback.

12. A solid state soft start controller system comprising:
a power supply;
an electric motor;
a thyristor means electrically interconnected between said power supply and said electric motor, said thyristor means for selectively allowing current to pass from said power supply to said electric motor;
a light-emitting diode optically connected to said thyristor means;
a controller means connected to said light-emitting diode for triggering said light-emitting diode; and
a light pipe optically interconnected between said light-emitting diode and said thyristor means, said light pipe being electrically isolated from said power supply.

13. A solid state soft start controller system comprising:
a power supply;
an electric motor;
a thyristor means electrically interconnected between said power supply and said electric motor, said thyristor means for selectively allowing current from said power supply to pass to said electric motor;
a light pipe optically connected to said thyristor means;
a laser diode optically connected to said thyristor means through said light pipe; and
a controller means connected to said laser diode for triggering said laser diode for passing light from said laser diode through said light pipe to said thyristor means.

14. The system of claim 13, said electric motor being a three-phase motor, said thyristor means comprising a first thyristor connected to a first phase of said three-phase motor, a second thyristor connected to a second phase of said three-phase motor, and a third thyristor connected to a third phase of said three-phase motor, said light pipe comprising a first light pipe optically connected between said laser diode and said first thyristor, a second light pipe optically connected between said laser diode and said second thyristor, and a third light pipe optically connected between said laser diode and said third thyristor, said laser diode comprising:
a first laser diode optically connected to said first light pipe;
a second laser diode optically connected to said second light pipe; and
a third laser diode optically connected to said third light pipe.

15. The system of claim 14, each of said firs laser diode and said second laser diode and third laser diode being a 940 nanometer laser producing a minimum of 40 milliwatts of power.

16. The system of claim 13, further comprising:
   a surge protector electrically connected to said electric motor; and
   a breakover diode means electrically connected between said power supply and said electric motor, said breakover diode means for dumping voltage above a desired level away from said thyristor means and to said surge protector.

17. The system of claim 13, said controller means comprising:
   a first sensor means electrically connected to said power supply for monitoring voltage supply phase and sink; and
   a second sensor means electrically connected to said electric motor for monitoring current feedback from said electric motor, said controller means for firing said light-emitting diode relative to the monitored voltage supply phase and sink and relative to the monitored current feedback.

18. A system for controlling current to a polyphase electric motor comprising:
   a first thyristor means electrically connected to a first phase of said polyphase electric motor, said first thyristor means for selectively allowing current to pass to said first phase;
   a second thyristor means electrically connected to a second phase of the polyphase electric motor, said second thyristor means for selectively allowing current to pass to said second phase;
   a third thyristor means electrically connected to a third phase of the polyphase electric motor, said third thyristor means for selectively allowing current to pass to said third phase;
   a first laser diode optically connected to said first thyristor means;
   a second laser diode optically connected to said second thyristor means;
   a third laser diode optically connected to said third thyristor means;
   a controller means connected to said first laser diode and said second laser diode and said third diode for selectively triggering the laser diodes in a desired manner relative to sensed voltage from the power supply and relative sensed current from the electric motor;
   a first light pipe optically connected between said first laser diode and said first thyristor means;
   a second light pipe optically connected between second laser diode and said second thyristor means; and
   a third light pipe optically connected between said third laser diode and said third thyristor means.

19. The system of claim 18, each of said first thyristor means and said second thyristor means and said third thyristor means comprising a pair of thyristors connected in series.

20. The system of claim 18, each of said first laser diode and said second laser diode and third laser diode being a 940 nanometer laser producing a minimum of 40 milliwatts of power.

21. The system of claim 18, said controller means comprising:
   a first sensor means electrically connected to a power supply for the electric motor, said first sensor means for monitoring voltage supply phase and sink; and
   a second sensor means electrically connected to the electric motor for monitoring current feedback from the electric motor, said controller means for firing each of said first laser diode and said second laser diode and said third laser diode relative to the monitored voltage phase and sink and relative to the monitored current feedback.

* * * * *